(12) United States Patent
Kim et al.

(10) Patent No.: US 11,794,813 B2
(45) Date of Patent: Oct. 24, 2023

(54) VEHICLE BODY AND VEHICLE

(71) Applicants: Hyundai Motor Company, Seoul (KR); Kia Corporation, Seoul (KR)

(72) Inventors: Ho Yeon Kim, Daegu (KR); Seok Ju Gim, Seongnam-si (KR); Ji Ae Yong, Hwaseong-si (KR); Chul Hee Heo, Hwaseong-si (KR); Tae Gyu Park, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 212 days.

(21) Appl. No.: 17/340,523

(22) Filed: Jun. 7, 2021

(65) Prior Publication Data
US 2022/0185375 A1   Jun. 16, 2022

(30) Foreign Application Priority Data

Dec. 10, 2020   (KR) ................. 10-2020-0172447

(51) Int. Cl.
*B62D 21/11*  (2006.01)
*B62D 27/00*  (2006.01)
*B62D 23/00*  (2006.01)

(52) U.S. Cl.
CPC ............ *B62D 21/11* (2013.01); *B62D 23/005* (2013.01); *B62D 27/00* (2013.01)

(58) Field of Classification Search
CPC .... B60Y 2304/07; B62D 21/11; B62D 24/00; B62D 25/06; B62D 25/088; B62D 23/005; B62D 27/00; B62D 27/02; B62D 27/065; B62D 2204/128; B62D 2500/10; B62D 2202/02; B60G 2204/128; B60G 15/068; F16F 9/54
See application file for complete search history.

(56) References Cited

U.S. PATENT DOCUMENTS

| | | |
|---|---|---|
| 4,108,469 A | 8/1978 | Schwarzbich |
| 4,986,597 A | 1/1991 | Clausen |
| 5,209,541 A | 5/1993 | Janotik |

(Continued)

FOREIGN PATENT DOCUMENTS

| | | | | |
|---|---|---|---|---|
| CN | 107054039 A | | 8/2017 | |
| CN | 112046615 A | * | 12/2020 | ............. B62D 25/02 |

(Continued)

OTHER PUBLICATIONS

European Patent Office, Extended European Search Report issued in Application No. 21186601.4, dated Jan. 1, 2022, 12 pages.

*Primary Examiner* — Lori Lyjak
(74) *Attorney, Agent, or Firm* — Slater Matsil, LLP

(57) ABSTRACT

An embodiment vehicle body includes a plurality of shock absorber housings configured to cover and support upper ends of respective shock absorbers connected to the wheels of a vehicle, a plurality of upper truss members, each of which is connected at one end thereof to a front shock absorber housing and extends upwards while being bent and is connected at a remaining end thereof to a rear shock absorber housing so as to constitute a corresponding one of two lateral pillars of the vehicle; and a roof member, which extends in a width direction of the vehicle and is connected at two ends thereof to upper portions of the plurality of upper truss members.

20 Claims, 3 Drawing Sheets

(56) References Cited

U.S. PATENT DOCUMENTS

| | | | |
|---|---|---|---|
| 5,549,352 | A | 8/1996 | Janotik et al. |
| 5,692,798 | A | 12/1997 | Wehner et al. |
| 6,073,992 | A | 6/2000 | Yamauchi et al. |
| 6,135,498 | A | 10/2000 | Vlahovic |
| 6,282,790 | B1 | 9/2001 | Jaekel et al. |
| 6,334,642 | B1 | 1/2002 | Waldeck et al. |
| 6,824,204 | B2 | 11/2004 | Gabbianelli et al. |
| 6,948,768 | B2 | 9/2005 | Corcoran et al. |
| 7,677,646 | B2 * | 3/2010 | Nakamura ............. B62D 33/06 296/205 |
| 8,998,216 | B2 | 4/2015 | Maeda et al. |
| 9,004,499 | B2 | 4/2015 | Zeweke et al. |
| 10,800,224 | B2 | 10/2020 | Sellars et al. |
| 11,505,260 | B2 | 11/2022 | Heo et al. |
| 2010/0194086 | A1 | 8/2010 | Yamamura et al. |
| 2012/0255799 | A1 | 10/2012 | Kohler et al. |
| 2014/0124277 | A1 | 5/2014 | Kurakawa et al. |
| 2014/0144719 | A1 | 5/2014 | Morgan et al. |
| 2014/0224557 | A1 | 8/2014 | Wu |
| 2015/0291056 | A1 | 10/2015 | Nozaki |
| 2015/0343900 | A1 | 12/2015 | Schlangen et al. |
| 2016/0347373 | A1 | 12/2016 | An et al. |
| 2017/0174069 | A1 | 6/2017 | Oyama et al. |
| 2017/0217296 | A1 | 8/2017 | Nomura et al. |
| 2017/0225714 | A1 | 8/2017 | Ito |
| 2017/0225715 | A1 | 8/2017 | Kobayashi et al. |
| 2017/0246942 | A1 | 8/2017 | Takaki et al. |
| 2017/0334278 | A1 | 11/2017 | Yamamoto |
| 2019/0118631 | A1 | 4/2019 | Yamamoto et al. |
| 2019/0299737 | A1 | 10/2019 | Sellars et al. |
| 2020/0039586 | A1 | 2/2020 | Ayuzawa |
| 2020/0223303 | A1 | 7/2020 | Saeki |
| 2020/0269922 | A1 * | 8/2020 | Kiyoshita ............ B62D 21/155 |
| 2020/0307701 | A1 | 10/2020 | Park et al. |
| 2020/0324821 | A1 | 10/2020 | Heo |
| 2021/0188028 | A1 * | 6/2021 | Lou ..................... B60G 15/068 |
| 2021/0339617 | A1 | 11/2021 | Ohkuma et al. |
| 2022/0097511 | A1 | 3/2022 | Wang et al. |
| 2022/0176787 | A1 | 6/2022 | Ostertag et al. |
| 2022/0185125 | A1 | 6/2022 | Gim et al. |
| 2022/0185377 | A1 | 6/2022 | Yong et al. |
| 2022/0388580 | A1 | 12/2022 | Li et al. |
| 2023/0095674 | A1 | 3/2023 | Inami et al. |

FOREIGN PATENT DOCUMENTS

| | | | |
|---|---|---|---|
| EP | 0856455 | A2 * | 8/1998 |
| EP | 1084937 | A2 | 3/2001 |
| JP | 6597761 | B2 | 10/2019 |
| KR | 19980002690 | | 1/1998 |
| KR | 19980070976 | A | 10/1998 |
| KR | 20150118809 | A | 10/2015 |
| WO | 2005066012 | A1 | 7/2005 |
| WO | 2015118809 | A1 | 8/2015 |
| WO | 2018078989 | A1 | 5/2018 |

\* cited by examiner

VEHICLE BODY AND VEHICLE

CROSS-REFERENCE TO RELATED APPLICATIONS

This application claims the priority benefit of Korean Patent Application No. 10-2020-0172447, filed in the Korean Intellectual Property Office on Dec. 10, 2020, which application is hereby incorporated herein by reference.

TECHNICAL FIELD

The present disclosure relates to a vehicle body of an in-wheel platform vehicle including a plurality of shock absorber housings positioned above respective wheels of the vehicle, a plurality of upper truss members, each of which connects the shock absorber housings to each other at a lateral side of the vehicle, and a roof member connecting the upper truss members to each other.

BACKGROUND

In general, a vehicle body should be designed to allow various components in the vehicle to be mounted thereon and, when a collision impact is applied to the vehicle, to efficiently absorb the collision impact and thus to protect passengers in the vehicle from the collision impact.

A conventional vehicle requires a space in which an engine or a battery is mounted and a space in which wheels, a suspension device, a steering device and the like for driving the vehicle are mounted. Accordingly, because wheel housings for accommodating the wheels, the suspension device provided at the wheels, the steering device connecting the wheels to each other, the drive device for supplying driving force and the like occupy a considerable amount of space, the vehicle body should be designed to provide sufficient space to accommodate the components and to absorb impacts applied to the vehicle. Furthermore, as the number of associated components increases, the process of manufacturing and assembling the vehicle is increasingly complicated, and the time required to perform the process is increased.

In recent years, an in-wheel system, in which a drive unit, a steering unit, a reduction gear and the like are mounted, has been developed. In the in-wheel system, because there is no need to connect the individual wheels to each other, the vehicle body should also be designed differently from a conventional vehicle. Accordingly, when a vehicle adopts the in-wheel system, there is a need to develop a vehicle body capable of providing space for wheel housings, ensuring sufficient rigidity of the vehicle body and simplifying a process of manufacturing and assembling the vehicle body.

The details described as the background art are intended merely for the purpose of promoting understanding of the background of the present invention, and should not be construed as an acknowledgment of the prior art that is previously known to those of ordinary skill in the art.

SUMMARY

Therefore, embodiments of the present invention have been made in view of the above problems, and it is an object of embodiments of the present invention to provide a vehicle body of an in-wheel platform vehicle including a plurality of shock absorber housings positioned above respective wheels, a plurality of upper truss members, each of which connects front and rear shock absorber housings to each other at a lateral side of the vehicle, and a roof member disposed in a width direction of the vehicle so as to connect the upper portions of the upper truss members to each other.

In accordance with embodiments of the present invention, the above and other objects can be accomplished by the provision of a vehicle body including a plurality of upper truss members, which constitute two lateral pillars and each of which is connected at a front end thereof to a front body of a vehicle and extends upwards while being bent and is connected at a rear end thereof to a rear body of the vehicle, and a roof member, which extends in a width direction of the vehicle and is coupled at two ends thereof to the plurality of upper truss members so as to connect upper portions of the upper truss members to each other, wherein the two ends of the roof member are slidable along the upper portions of the upper truss members.

The front body and the rear body of the vehicle, to which front and rear ends of the upper truss member are respectively connected, may respectively be a front shock absorber housing and a rear shock absorber housing, which cover and support upper ends of respective shock absorbers connected to wheels of the vehicle.

Each of the plurality of upper truss members may have a coupling groove formed in a side surface thereof, the coupling groove being formed so as to face the inside of the vehicle.

Each of ends of the roof member may include a coupling protrusion such that the coupling protrusion of the roof member is fitted into the coupling groove in the upper truss member so as to couple the roof member to the upper truss member.

Each of ends of the roof member may include a coupling protrusion such that the coupling protrusion of the roof member slides along the coupling groove in the upper truss member from a front or rear side of the vehicle so as to couple the roof member to the upper truss member.

Each of ends of the roof member may include therein a reception groove such that the each of the ends of the roof member is coupled to a corresponding one of the plurality of upper truss members so as to surround the corresponding one of the plurality of upper truss members when the corresponding one of the plurality of upper truss members is inserted into the reception groove.

The each of the ends of the roof member may be coupled to the corresponding one of the plurality of upper truss members through bolting at a plurality of points on the end of the roof member opposite the reception groove.

Each of ends of the roof member may be provided with at least one closed surface such that the each of the ends of the roof member is coupled to a corresponding one of the plurality of upper truss members via the closed surface in a surface-contact state.

The closed surface of the end of the roof member may be provided with a flange projecting in an outward direction of the closed surface such that the each of the ends of the upper truss member is coupled to the roof member in a state of being in surface contact with the closed surface and the flange.

The roof member may be configured to have a width that decreases toward a center therefor from an end thereof, and a windshield glass may be coupled to a front or rear surface of the roof member.

The vehicle body may further include a plurality of support members, configured to connect the roof member to the plurality of upper truss members, wherein each of the plurality of support members is coupled at one end thereof to a side surface of a corresponding one of the plurality of upper truss members and at a remaining end thereof to a front or rear surface of the roof member.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF ILLUSTRATIVE EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
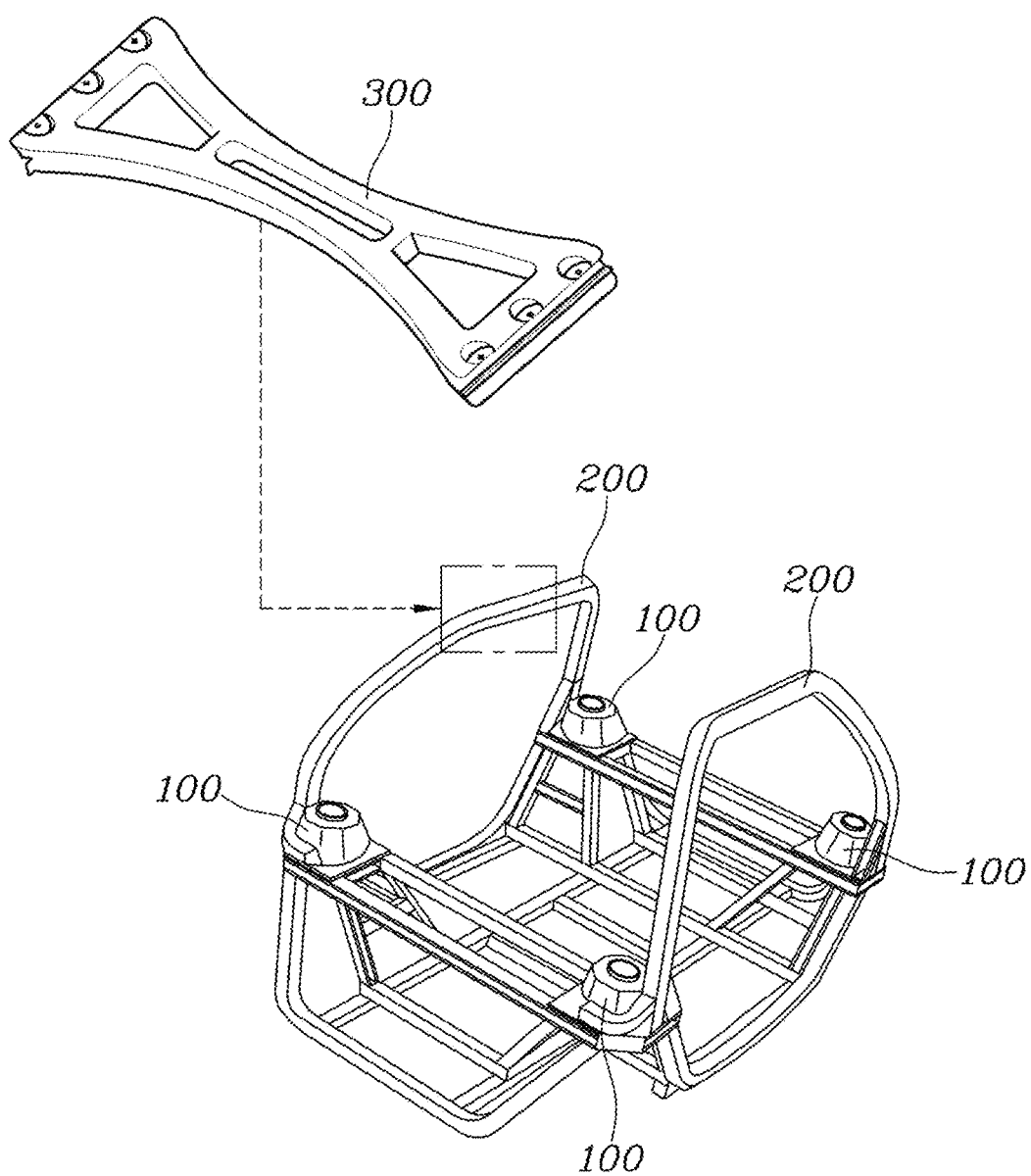
FIG. 1 is a view illustrating a vehicle body according to an embodiment of the present invention in which a roof member is coupled to the upper end of an upper truss member.
Figure 2:
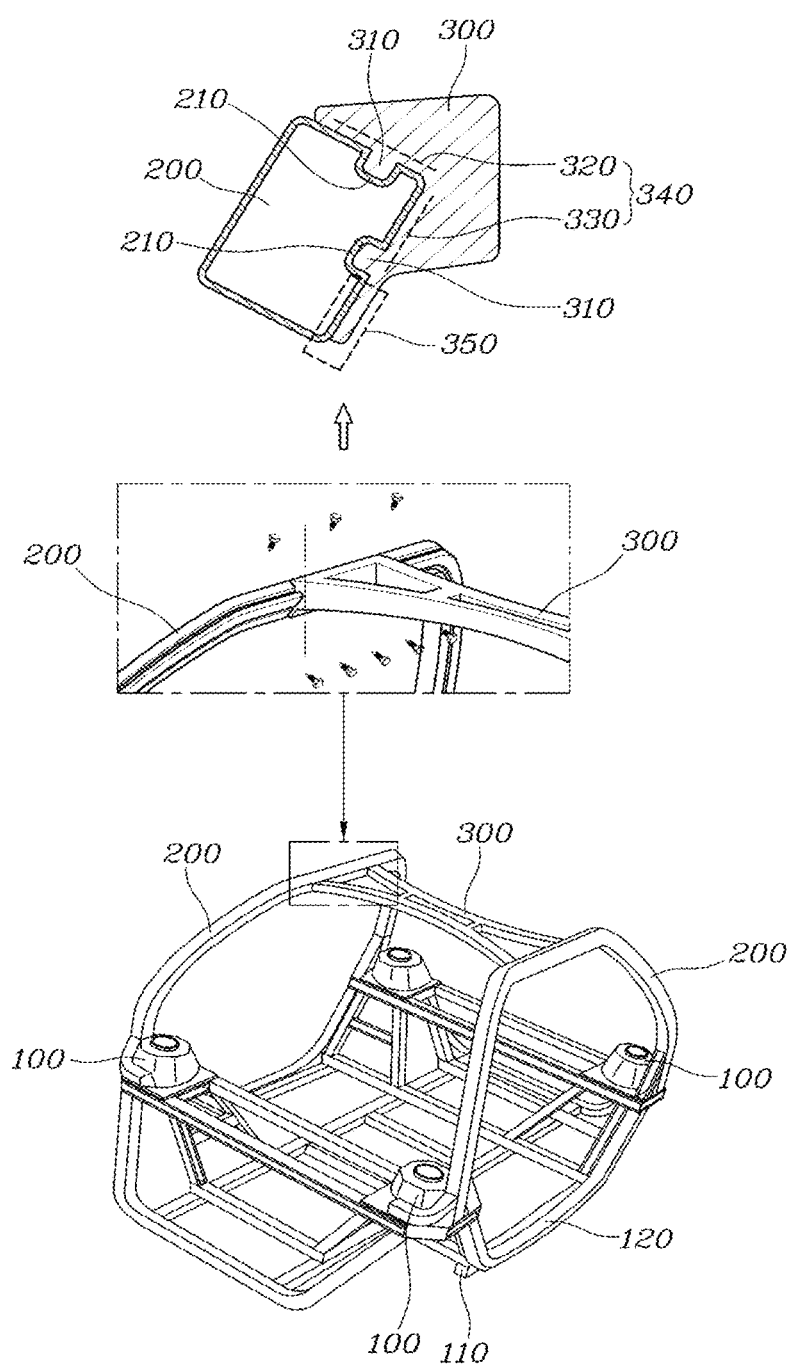
FIG. 2 is a view illustrating the vehicle body according to an embodiment of the present invention in which the roof member is disposed between the upper truss members and is coupled thereto.
Figure 3:
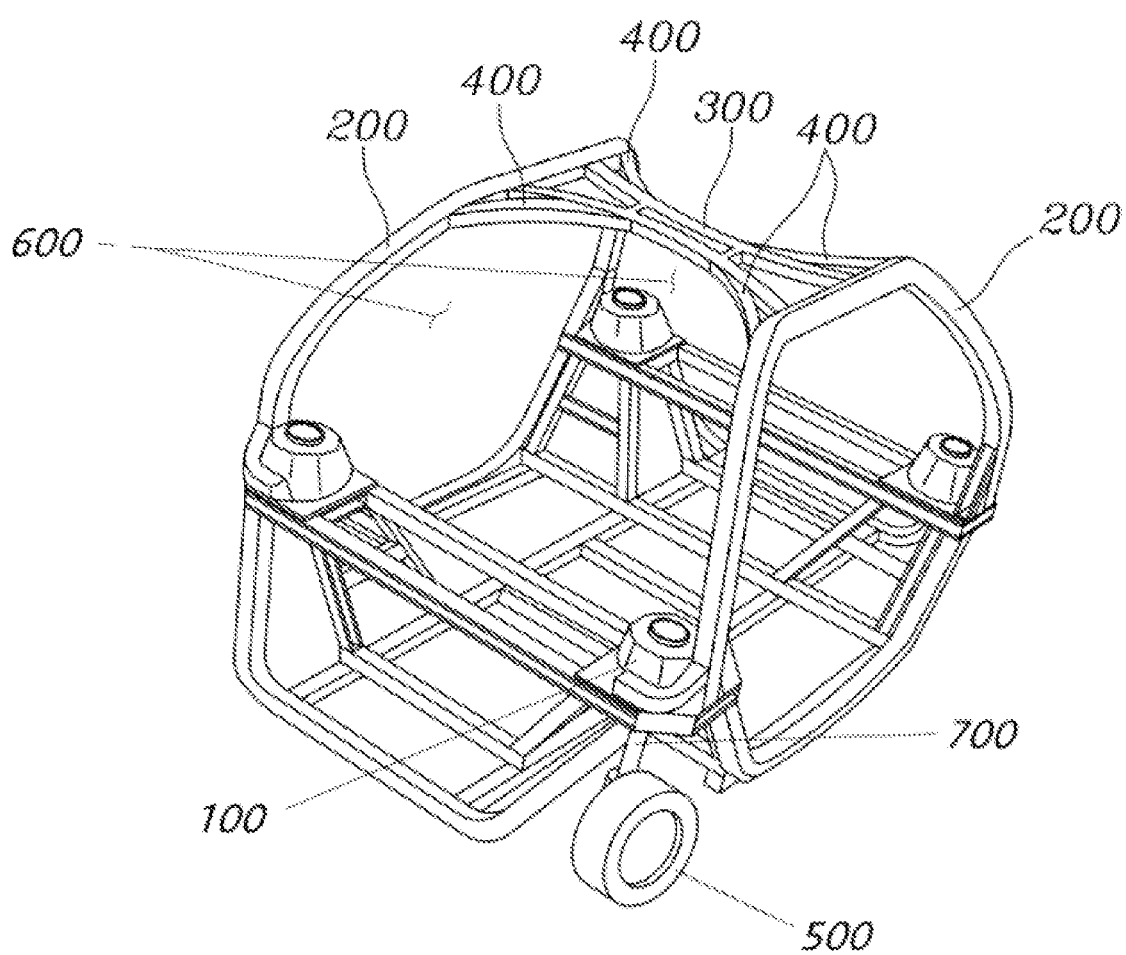
FIG. 3 is a view illustrating the vehicle body according to an embodiment of the present invention in which support members are coupled to the roof member and the upper truss members so as to support them.

FIG. 1 is a view illustrating a vehicle body according to an embodiment of the present invention in which a roof member is coupled to the upper end of an upper truss member. FIG. 2 is a view illustrating the vehicle body according to an embodiment of the present invention in which the roof member is disposed between the upper truss members and is coupled thereto. FIG. 3 is a view illustrating the vehicle body according to an embodiment of the present invention in which support members are coupled to the roof member and the upper truss members so as to support them.

FIG. 1 is a view illustrating a vehicle body according to an embodiment of the present invention in which a roof member is coupled to the upper end of an upper truss member. The vehicle body according to this embodiment of the present invention includes a plurality of upper truss members 200, which are connected at the front ends thereof to the front body of the vehicle body, extend while being bent, and are connected at the rear ends thereof to the rear body of the vehicle body so as to define two side pillars of the vehicle, and a roof member 300, which extends in the width direction of the vehicle and is connected at both ends thereof to the upper portions of the plurality of upper truss members 200, wherein the two ends of the roof member 300 are slidably coupled to the upper portions of the upper truss members 200 in the longitudinal direction of the vehicle.

The front body and the rear body, to which the front end and the rear end of each of the upper truss members 200 are connected, may be a front shock absorber housing 100 and a rear shock absorber housing 100.

Unlike conventional vehicles, the vehicle body according to an embodiment of the present invention is intended to be applied to a vehicle adopting an in-wheel system, and does not require a drive shaft or a steering device to be connected to the wheels. Accordingly, each of the wheels of the vehicle is provided with a shock absorber and a shock absorber housing 100 above the wheel, and the lateral sides of the vehicle are provided with the upper truss members 200, which connect the front and rear vehicle body members or the front and rear shock absorber housings 100 to each other, so as to ensure the rigidity of the vehicle body. The upper truss members 200 are connected to each other by means of the roof member 300, which is coupled to the upper truss members 200 so as to slide in the longitudinal direction of the vehicle.

Specifically, each of the upper truss members 200 is coupled at respective ends thereof to the upper surfaces of the front and rear vehicle body members or the front and rear shock absorber housings 100, and extends upwards while being bent, thereby defining the cabin room of the vehicle. The upper truss members 200 are connected to each other via the roof member 300, and the roof member 300 is coupled at two ends thereof to side surfaces of the upper truss members 200, thereby defining the roof of the vehicle and ensuring the rigidity of the upper portion of the vehicle body.

FIG. 2 is a view illustrating the vehicle body according to an embodiment of the present invention in which the roof member is disposed between the upper truss members and is coupled thereto. In the vehicle body according to an embodiment of the present invention, each of the upper truss members 200 may be provided in a side surface thereof with a coupling groove 210, which faces the inside of the vehicle. In the vehicle body according to an embodiment of the present invention, the end of the roof member 300 is provided with a coupling protrusion 310. Accordingly, the roof member 300 may be coupled to the upper truss member 200 by fitting the coupling protrusion 310 into the coupling groove 210 in the upper truss member 200. In the vehicle body according to an embodiment of the present invention, each end of the roof member 300 may be provided with the coupling protrusions 310, and the roof member 300 may be coupled to the upper truss member 200 in such a way that the coupling protrusion 310 slides along the coupling groove 210 from the front or rear side of the vehicle body.

Specifically, a vehicle body member constituting a conventional roof is conveyed from above and is coupled to the upper end of a pillar member. In contrast, in the vehicle body according to an embodiment of the present invention, because the coupling groove 210 is formed in the upper truss member 200 longitudinally, the roof member 300 is conveyed longitudinally from the front or rear side of the vehicle, unlike the conventional vehicle body. In this way, the roof member 300 is easily fitted between the upper truss members 200, and is coupled thereto. In order to ensure easier assembly and to further increase the rigidity of the vehicle body and the coupling rigidity between the members, the coupling groove 210 formed in each of the upper truss members 200 may include at least one coupling groove, and the coupling protrusion 310 formed at one end of the roof member 300 may include at least one coupling protrusion.

In the vehicle body according to an embodiment of the present invention, each end of the roof member 300 may have formed therein a reception groove 340, and the end of the roof member 300 may be coupled to the upper truss member 200 so as to surround the upper truss member 200 in the state in which the upper truss member 200 is inserted into the reception groove 340. In the vehicle body according to an embodiment of the present invention, the roof member 300 may be fastened to the upper truss member 200 through bolting or the like at a plurality of points on the outer side of the upper truss member 200 opposite the reception groove 340.

Specifically, because the roof member 200 and the upper truss member 200 are coupled to each other not only by the engagement between the coupling protrusion 310 and the coupling groove 210 but also by the insertion of the protruding side surface of the upper truss member 200 into the reception groove 340 formed in the end of the roof member 200, it is possible to ensure further increased coupling rigidity. Furthermore, since the roof member 300 is fastened to the upper truss member 200 through bolting or the like at a plurality of points on the outer side of the upper truss member 200 opposite the reception groove 340, there are effects of maintaining the rigidity of the vehicle body or the coupling rigidity between the members and of enabling a human or a robot to easily and conveniently assemble the members in an assembly process.

In addition, each end of the roof member 300 may be provided with one or more closed surfaces 320 and 330, and the upper truss member 200 may be in surface contact with the closed surfaces 320 and 330. In the vehicle body according to an embodiment of the present invention, the closed surface of the roof member 300 may be provided with a flange 350 extending outwards therefrom, and the roof member 300 may thus be coupled to the upper truss member 200 in the state in which the upper truss member 200 is in surface contact with the closed surface 330 and the flange 350 of the roof member 300.

Specifically, the closed surfaces 320 and 330, which have a large overall area, may be formed on the end of the roof member 300 is the longitudinal direction of the vehicle, and the roof member 300 may be coupled to the upper truss member 200 in the state of being in surface contact with the side surface of the upper truss member 200. As mentioned above, since each end of the roof member 300 is formed with the reception groove 340 and the side surface of the upper truss member 200 is in surface contact with the upper and lower surfaces of the reception groove 340, that is, the two closed surfaces of the reception groove 340, there is an effect of further increasing the rigidity of the vehicle body and the assembly rigidity between the members. Furthermore, the closed surfaces 320 and 330, which are formed at the upper and lower portion of the reception groove 340, may extend outwards to define the flange 350, and the flange 350 may surround the upper truss member 200 to thus realize a larger area of surface contact with the upper truss member 200. Accordingly, there are effects of ensuring further increased rigidity of the vehicle body and assembly rigidity and of providing a seating surface for bolting in coupling between the members.

In the vehicle body according to an embodiment of the present invention, the roof member 300 may be configured such that the width thereof decreases inwards from the end thereof, and a windshield glass of the vehicle may be coupled to the front or rear surface of the roof member 300. The ends of the roof member 300 are widened, and are coupled to the side surfaces of the upper truss members 200, thereby ensuring increased coupling rigidity. Since the roof member 300 is configured to have a sector shape such that the width thereof decreases toward the center thereof and a windshield glass is coupled to the front or rear surface of the roof member 300, there is an effect of further widening a field of view of a driver in a forward or backward direction.

FIG. 3 is a view illustrating the vehicle body according to an embodiment of the present invention in which support members are coupled to the roof member and the upper truss members so as to support the same. The vehicle body according to an embodiment of the present invention further includes a plurality of support members 400 configured to connect the upper truss members 200 to the roof member 300 and to support them. Each of the support members 400 may be coupled at one end thereof to the side surface of the upper truss member 200 and at the other end thereof to the front or rear surface of the roof member 300.

Specifically, the plurality of support members 400 may serve as additional reinforcing members for the roof member 300, and two thereof may be provided at each of the front and rear sides of the upper truss members 200 and the roof member 300. Each of the support members 400 is also configured to have a sector shape so as to support the members and increase the rigidity of the members, and the fields of view of a driver in forward and backward directions are not obstructed even when a windshield glass is mounted thereto.

In the vehicle body according to an embodiment of the present invention, the lower part of the vehicle may ensure the collision rigidity thereof by virtue of a floor member no, a front or rear lower truss member and a lateral lower truss member 120, and the upper part of the vehicle may ensure the collision rigidity thereof and distribution of a load to the members by virtue of the upper truss members 200 and the roof member 300 connecting the upper truss members 200 to each other.

As is apparent from the above description, a vehicle body of an in-wheel platform vehicle according to an embodiment of the present invention includes a plurality of shock absorber housings 100 positioned above and connected, via shock absorbers 700, to respective wheels 500, a plurality of upper truss members 200, each of which connects front and rear shock absorber housings too to each other at a lateral side of the vehicle, and a roof member 300 disposed in a width direction of the vehicle so as to connect the upper portions of the upper truss members 200 to each other. In the vehicle body according to an embodiment of the present invention, a windshield glass 600 of the vehicle may be coupled to the front surface or the rear surface of the roof member 300.

Although preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A vehicle body comprising:
   a plurality of upper truss members, wherein each upper truss member comprises two lateral pillars, is connected at a front end thereof to a front body of a vehicle, extends upwards while being bent, and is connected at a rear end thereof to a rear body of the vehicle; and
   a roof member extending in a width direction of the vehicle and coupled at two ends thereof to the plurality of upper truss members so as to connect upper portions of the upper truss members to each other,
   wherein the two ends of the roof member are coupled to the upper portions of the upper truss members, respectively,
   wherein the roof member has a width that decreases toward a center thereof from an end thereof, and
   wherein a windshield glass is coupled to a front surface or a rear surface of the roof member.

2. The vehicle body according to claim 1, wherein the front body and the rear body of the vehicle, to which the front end and the rear end of a respective upper truss member are respectively connected, are a front shock absorber housing and a rear shock absorber housing, which cover and support upper ends of respective shock absorbers connected to wheels of the vehicle.

3. The vehicle body according to claim 1, wherein each of the plurality of upper truss members includes a coupling groove formed in a side surface thereof, the coupling groove facing an inside of the vehicle.

4. The vehicle body according to claim 3, wherein each end of the roof member includes a coupling protrusion that is fitted into the coupling groove in a respective upper truss member so as to couple the roof member to the respective upper truss member.

5. The vehicle body according to claim 3, wherein each end of the roof member includes a coupling protrusion configured to be slidable along the coupling groove in a respective upper truss member from a front side or a rear side of the vehicle so as to couple the roof member to the respective upper truss member.

6. The vehicle body according to claim 1, wherein each end of the roof member includes therein a reception groove coupled to a corresponding one of the plurality of upper truss members so as to surround the corresponding one of the plurality of upper truss members inserted into the reception groove.

7. The vehicle body according to claim 6, wherein each end of the roof member bolted to the corresponding one of the plurality of upper truss members at a plurality of points on the end of the roof member opposite a respective reception groove.

8. The vehicle body according to claim 1, wherein each end of the roof member has at least one closed surface coupled to a corresponding one of the plurality of upper truss members in a surface-contact state.

9. The vehicle body according to claim 8, wherein the closed surface of the end of the roof member has a flange projecting in an outward direction of the closed surface such that each end of a respective upper truss member is coupled to the roof member via surface contact with the closed surface and the flange.

10. The vehicle body according to claim 1, further comprising a plurality of support members connecting the roof member to the plurality of upper truss members,
wherein each of the plurality of support members is coupled at one end thereof to a side surface of a corresponding one of the plurality of upper truss members and at a remaining end thereof to a front or rear surface of the roof member.

11. An in-wheel platform vehicle comprising:
a plurality of front and rear shock absorber housings;
a vehicle body comprising:
a plurality of upper truss members, wherein each upper truss member comprises two lateral pillars, is connected at a front end thereof to a respective front shock absorber housing, extends upwards while being bent, and is connected at a rear end thereof to a respective rear shock absorber housing; and
a roof member extending in a width direction of the vehicle and coupled at two ends thereof to the plurality of upper truss members so as to connect upper portions of the upper truss members to each other, wherein the two ends of the roof member are connected to the upper portions of the upper truss members;
a plurality of wheels disposed under the plurality of shock absorber housings; and
a plurality of shock absorbers coupling the plurality of wheels to the vehicle body,
wherein each shock absorber has a lower end connected to a respective wheel and an upper end supported by a respective shock absorber housing,
wherein the roof member has a width that decreases toward a center thereof from an end thereof, and
wherein a windshield glass is coupled to a front or rear surface of the roof member.

12. The in-wheel platform vehicle according to claim 11, wherein each of the plurality of upper truss members includes a coupling groove formed in a side surface thereof, the coupling groove facing an inside of the vehicle.

13. The in-wheel platform vehicle according to claim 12, wherein each end of the roof member includes a coupling protrusion that is fitted into the coupling groove in a respective upper truss member so as to couple the roof member to the respective upper truss member.

14. The in-wheel platform vehicle according to claim 12, wherein each end of the roof member includes a coupling protrusion configured to be slidable along the coupling groove in a respective upper truss member from a front or rear side of the vehicle so as to couple the roof member to the respective upper truss member.

15. The in-wheel platform vehicle according to claim 11, wherein each end of the roof member includes therein a reception groove coupled to a corresponding one of the plurality of upper truss members so as to surround the corresponding one of the plurality of upper truss members inserted into the reception groove.

16. The in-wheel platform vehicle according to claim 15, wherein each end of the roof member bolted to the corresponding one of the plurality of upper truss members at a plurality of points on the end of the roof member opposite a respective reception groove.

17. The in-wheel platform vehicle according to claim 11, wherein each end of the roof member has at least one closed surface coupled to a corresponding one of the plurality of upper truss members in a surface-contact state.

18. The in-wheel platform vehicle according to claim 17, wherein the closed surface of the end of the roof member has a flange projecting in an outward direction of the closed surface such that each end of a respective upper truss member is coupled to the roof member via surface contact with the closed surface and the flange.

19. A vehicle body comprising:
a plurality of upper truss members, wherein each upper truss member comprises two lateral pillars, is connected at a front end thereof to a front body of a vehicle, extends upwards while being bent, and is connected at a rear end thereof to a rear body of the vehicle; and
a roof member extending in a width direction of the vehicle and coupled at two ends thereof to the plurality of upper truss members so as to connect upper portions of the upper truss members to each other,
wherein the two ends of the roof member are coupled to the upper portions of the upper truss members, respectively, and
wherein each end of the roof member has at least one closed surface coupled to a corresponding one of the plurality of upper truss members in a surface-contact state.

20. The vehicle body according to claim 19, wherein the closed surface of the end of the roof member has a flange projecting in an outward direction of the closed surface such that each end of a respective upper truss member is coupled to the roof member via surface contact with the closed surface and the flange.

* * * * *